United States Patent [19]

Morrison

[11] Patent Number: 4,745,032
[45] Date of Patent: May 17, 1988

[54] ROOFING AND SIMILAR MATERIALS

[75] Inventor: Bernard J. Morrison, Reading, Pa.

[73] Assignee: AcrySyl International Corporation, Reading, Pa.

[21] Appl. No.: 931,942

[22] Filed: Nov. 19, 1986

Related U.S. Application Data

[63] Continuation of Ser. No. 498,715, May 27, 1983, abandoned.

[51] Int. Cl.$^4$ .................... B32B 15/08; B32B 5/06
[52] U.S. Cl. ............................ 428/215; 428/328;
428/463; 428/520; 428/519; 428/307.3;
428/514; 52/309.1; 52/309.17; 106/DIG. 1;
106/287.35; 524/556; 524/65
[58] Field of Search .................................. 428/215

[56] References Cited

U.S. PATENT DOCUMENTS

| | | | |
|---|---|---|---|
| 2,795,564 | 6/1957 | Conn et al. | 526/93 X |
| 3,450,661 | 6/1969 | Neel et al. | 156/33 X |
| 3,819,556 | 6/1974 | Morisawa | 260/29.6 PS |
| 4,073,753 | 2/1978 | Hauge | 260/2.3 |
| 4,229,329 | 10/1980 | Bennett | 106/287.35 X |

OTHER PUBLICATIONS

"A New Acrylic Polymer for Elastomeric Roof Mastics," Lawrence S. Frankel et al, Resin Review, 1982, vol. XXXII, No. 1.
"Rhoplex Acrylic Emulsions & Additives for Water-Based Paints," Oct. 1980, brochure, Rohm & Haas Co., Philadelphia, PA 19105 (#81A34).
"Elastomeric Roof Mastics–Rhoplex Acrylics from Rohm and Haas", a Feb. 1982 brochure by the Rohm and Haas Company, (No. 83E3).
"The Elastomeric Roof Market 1981," A Feb. 1982 brochure by the Rohm and Haas Company, (No. 83E4).
"Adhesives–Rhoplex AC-22", A Jul. 1980, brochure by the Polymers Resins and Monomers Division, Rohm and Haas Company, Philadelphia, PA 19105, (No. 83A13).
"A New Acrylic Polymer for Elastomeric Roof Mastics, " by Lawrence S. Frankel, Douglas A. Perry and Joseph A. Lavelle, Resin Review, 1982 vol. XXXII, No. 1, Reprinted by the Rohm and Haas Company, Philadelphia, PA 19105. (No. RR11).
"Elastomeric Roof Mastics–Rhoplex EC-1685", an Apr. 1982 brochure by the Polymers Resins and Monomers Division, Rohm and Haas Company, (No. 83E2).
"Elastomeric Roof Mastics, Experimental Emulsion E-1895," an Oct. 1982, brochure by the Polymers Resins and Monomers Division, Rohm and Haas Company, (Brochure No. 83E7).
"Semi Gloss Enamels Made with Rhoplex AC-22", an Oct. 1967 brochure by the Rohm and Haas Company, (No. C230).
Abel Banov, *Paintings and Coatings Handbook* (Structures Publishing Company, Farmington, Michigan, 1973) pp. 32–34, 48–50, 158–159, 322–323.
"Elastomeric Roof Mastics–Experimental Emulsion E-1791" an undated brochure by the Polymers Resins and Monomers Division, Rohm and Haas Company.
"Textile Chemicals–Rhoplex Ac-22 and Rhoplex AC-33", a Feb. 1977 brochure, by the Polymers Resins and Monomers Division, Rohm and Haas Company, (No. 21A1).
"Trade Sales Coatings–Rhoplex AC-507 Acrylic Emulsion Polymer for Exterior Gloss Paints" a Jul. 1980 brochure by the Polymers, Resins and Monomers Division, Rohm and Haas Company, (No. 81A13).

*Primary Examiner*—P. C. Ives
*Attorney, Agent, or Firm*—Alexis Barron

[57] ABSTRACT

An article of construction comprising a substrate coated with a multi-ply coating including an acrylic resin coating adhered to the surface of said substrate and underlying and adhered to an overlying acrylic resin coating, the acrylic resin of said underlying coating being a different acrylic resin than that of said underlying coating, the adhesive bond between said overlying and underlying coatings being stronger than if the bond were between two coatings formed from the same acrylic resin, and including embodiments in which fly ash is included in either the underlying or the overlying coating.

6 Claims, No Drawings

ROOFING AND SIMILAR MATERIALS

This is a continuation of co-pending application Ser. No. 498,715 filed on May 27, 1983 now abandoned.

FIELD OF THE INVENTION

The present invention will be described initially in connection with its use as a roofing material. It should be understood, however, that the invention is capable of being used in other types of applications, as will become evident from the detailed description of the invention.

Unless stated otherwise, the term "roofing material" is used herein to encompass within its meaning materials which are used in fabricating new roofs or in replacing the entirety of a defective roof or in refinishing or repairing portions of a defective roof.

It is well established that a satisfactory roofing material, for example, one which will be accepted as a successfully commercial product, must possess a combination of properties, including satisfactory physical and chemical properties. For many applications, it is mandatory that the roofing material possesses aesthetic properties also.

For example, the roofing material must be water resistant and it must possess a combination of other physical and chemical properties that make it resistant to wear and that allow it to be applied in a manner such that it can be handled readily and without damage. Thus, for example, the roofing material must possess the right degree of flexibility, strength, abrasive resistance, hardness, toughness, impact resistance, and chemical resistance, and preferably fire resistance. And such properties must be retained in the roofing material over a wide temperature range, for example, $-50°$ F. to $350°$ F.

In addition, the roofing material must resist degradation, that is, exhibit good weathering characteristics, as it is subjected to a wide variety of environmental conditions. Thus, it is not enough that the roofing material possesses initially the aforementioned types of properties, the properties must be retained over a long period of time, for example, 10 to 20 years or more, as the material is subjected to a variety of weather conditions. Such conditions can include, in addition to wide temperature variations, exposure to the sun's ultra violet and infrared rays which can effect in the roofing material chemical changes which in turn can affect adversely desired physical and chemical properties of the material. Other environmental conditions which are known to wreak havoc with many types of materials are exposure to acid rain, to salt spray, and freeze/thaw cycling. Accordingly, the roofing material must be capable of resisting degradation to a satisfactory degree upon being subjected to such conditions.

Resistance to being degraded by exposure to the aforementioned "inanimate" conditions is but one of the basic properties of a desirable roofing material. Another basic property is resistance to "animate" conditions. In effect, the roofing material must be "animately inert" in that it must be a material which itself does not support or attract plant or animal life. For example, a material which is a food source for insects, birds, etc., is not tolerable.

With few exceptions, a satisfactory roofing material must also be relatively inexpensive. The exceptions involve the use of tiles, slate, shakes, and the like which are relatively expensive—so much so that such materials are not used widely and are considered to be specialty materials.

Examples of materials which are less expensive than the aforementioned and which are used more widely include asphalt shingles, asphalt roll roofing, tar and other bituminous materials. While such materials, including particularly asphalt shingles, have been used successfully to a significant extent for many years, there are disadvantages associated with their use. For example, shingles are not suitable for use on a flat roof and the aforementioned bituminous materials tend to degrade relatively quickly when used to cover flat roofs.

More recently, attention has been given to the use as a roofing material of synthetic resins, for example, acrylic resins, chlorosulfonated polyethylene, poly(vinyl chloride), silicone polymers, and polyurethanes. Such resins are purported to possess the basic properties that are desired of a roofing material and, in addition, certain advantages relative to the use of traditional roofing materials. In particular, labor costs associated with the installation of roofs made from such synthetic resinous materials tend to be lower than those associated with the installation of roofs made from other materials.

Acrylic resins and other synthetic resinous materials have been used for about 20-25 years as roofing materials in applications in which they have been applied in sheet form or in the form of a liquid composition which forms a solid coating as it dries or cures. The present invention relates to the use of acrylic resin-containing liquid compositions in roofing applications and in other applications, as will be described hereinbelow.

Reported Developments

It is known to apply liquid based acrylic resin compositions to suitable roofing substrates to form thereon a roofing material. Exemplary compositions comprise solid particles of acrylic resin dispersed in an aqueous phase of the composition, which itself is often referred to as an acrylic latex or emulsion (the resin being made typically by an emulsion polymerization process). As the water evaporates from the composition, the particles of resin coalesce to form a continuous solid film or coating. After the coating has been formed, another coat of the acrylic latex can be applied to form an overlying coating, and this process can be repeated as necessary until the coating has the desired thickness.

U.S. Pat. No. 4,229,329 to Bennett discloses a fire retardant composition comprising an acrylic resin latex (Rhoplex AC-234 or UCAR Latex 5000) and fly ash. The patent discloses the use of one or more coats of the composition on the interior or exterior of a structure as a protective coating which has fire retardant properties. The patent discloses also that the composition can be admixed with fibrous or other filler for making various types of articles, including shingles.

As mentioned above, the use of acrylic type latices (and also other types of resin-containing liquids) generally involves the application of two or more coatings of the latex in order to build up a coating of the desired thickness. Problems are encountered if a liquid film of the composition is applied at one time in the amount needed to form a coating of the desired thickness. In general, a relatively thick liquid film does not dry uniformly and the coating formed therefrom tends to crack. Relatively thick coatings can be applied by increasing the proportion of filler in the coating composition. However, this weakens the bonding properties of the coating and its resistance to weathering. Such problems can be avoided or minimized by the formation of multi-ply coatings, each having a thickness which does not lead to the aforementioned problems.

However, such a multi-ply coating process can in turn lead to problems. In this regard, it has been found that acrylic latices which form coatings having properties expected of roofing materials have the disadvantages that they do not form coatings which adhere well to themselves. This, of course, is extremely undesirable because it limits their use to forming a one-ply coating of limited thickness (not sufficient for many applications) or to forming a multi-ply coating which is subject to undesirable peeling.

The present invention is directed to providing improvements in roofing and other applications utilizing liquid compositions containing acrylic resins.

SUMMARY OF THE INVENTION

One aspect of the present invention is the provision of an article of construction comprising a substrate coated with a multi-ply coating including an acrylic resin coating adhered to the surface of said substrate and underlying and adhered to an overlying acrylic resin coating, the acrylic resin of said underlying coating having outdoor (exterior) properties and the acrylic resin of said overlying coating being a different acrylic resin than that of said underlying coating, the adhesive bond between said overlying and underlying coatings being stronger than if the bond were between two coatings formed from the acrylic resin of said underlying coating. Species of acrylic resins within the classes of acrylic resins for use in the practice of the present invention are known and are commercially available.

The present invention includes also a process for preparing the aforementioned article and includes the application to the substrate of a film of an acrylic resin-containing liquid composition for forming the aforementioned underlying coating, preferably allowing the film to dry, and thereafter forming the overlying coating from a liquid composition containing the acrylic resin from which the overlying coating is formed. The liquid compositions containing the aforementioned acrylic resins are preferably water-based compositions in the form of latices, that is, aqueous compositions containing dispersed solid particles of acrylic resin. Resins which are made by the emulsion polymerization process are referred to often as acrylic emulsions.

In essence, it has been found that various acrylic resins which possess properties that make them suitable for use as roofing materials form coatings which do not adhere well to each other. Thus, such resins cannot be used satisfactorily in applications where it is desired or necessary to apply several coatings of the resin. Developmental efforts have led to the discovery that other acrylic resins which have shortcomings as regards roofing properties form, nevertheless, excellent bonds with the aforementioned type of acrylic resins which possess excellent roofing properties. Accordingly, such acrylic resins, which have a good adhesive affinity for the "roofing acrylic resin", can be used to build up the coating thickness without sacrificing the quality of the multi-ply coating.

In preferred form, the coating composition which is used to form the underlying coating includes also fly ash. Such compositions are particularly advantageous in that coatings formed therefrom are highly resistant to fire and possess improved weathering characteristics. In addition, the use of such fly ash-containing compositions is also advantageous when coating substrates which have highly irregular or uneven surfaces as a result of cracks, fissures, or other imperfections, in that such compositions have particularly good "fill" and leveling properties. Accordingly, another aspect of the present invention involves the provision of a coating composition comprising particular acrylic resins admixed with fly ash.

Also, in preferred form, the overlying acrylic resin coating is itself sandwiched between the underlying resin coating and a top coating which in turn is formed from an acrylic resin having outdoor (exterior) properties, for example, the type of acrylic resin used in forming the underlying coating. In general, available highly adhesive acrylic resins of the type used in the overlying coating do not themselves have outdoor (exterior) properties, and accordingly, coatings formed therefrom should be covered with a top coating of an acrylic resin having such properties.

Still another aspect of the present invention involves coating a substrate, for example, that of a roof, with a highly adhesive acrylic resin, such as that mentioned above, and the application to such coating of a composition comprising an acrylic resin having outdoor (exterior) properties and fly ash. Such multi-ply coatings are particularly preferred embodiments of the present invention.

As will be described in detail below, the present invention can be used in coating various types of substrates with protective coatings that are exposed to outdoor conditions. However, it is believed that the invention will be used most widely as a protective coating for roofing. For roofing applications, it is preferred that the outdoor (exterior) acrylic resin be an acrylic resin of the type used in elastomeric roof mastics. The art recognizes such acrylic resins as possessing a combination of properties which makes them particularly suitable for use as roofing materials. Such properties include, but are not limited to, the ability to form coatings which have a unique balance of tensile strength, elongation and recovery, and control of moisture vapor transmission. In particular, coatings formed from such mastics are particularly good in expanding and contracting along with the roofing substrate to which they are applied without rupturing, due to their elongation properties. The combination of properties distinguishes such acrylic resins from those which are designed for use in outdoor (exterior) paints. Coatings formed from such paints, while exhibiting good weathering characteristics, are more suitable for use on surfaces which are not exposed to the sun rays and other environmental conditions in the same manner as a roof. The "roofing" acrylic resins will be referred to hereafter as "elastomeric roof acrylic resins".

Advantages which flow from the use of the present invention are numerous. For example, the invention provides a mechanism for realizing the benefits associated with roofing materials formed from synthetic resins, while permitting the formation of a multi-ply coating which possesses excellent bond integrity between plies of the coating. The coating exhibits excellent adhesion to many types of substrates, and accordingly, as will be explained in detail below, can be used in coating not only materials which are conventionally used as substrates for roofing materials, but also other types of materials used in the fabrication of buildings, retaining walls, traffic ways, etc. The compositions can be formulated in a manner such that they are easily applied and possess excellent adhesion in the freshly applied state to inclined surfaces, including vertical surfaces. Inasmuch as the compositions can be easily, indeed almost effortlessly, applied at a relatively fast rate of speed, labor costs associated with their application are relatively inexpensive. Accordingly, in the overall picture the total cost, including materials and labor, associated with the use of the invention are competitive. In effect, the invention provides low cost permanent protection for many types of applications.

DETAILED DESCRIPTION OF THE INVENTION

The underlying coating which is sandwiched between the substrate to be protected and the overlying coating is formed from a liquid composition containing an acrylic resin that is recognized as having good protective properties in an outdoor environment and protective properties which resist degradation upon being subjected to outdoor environmental conditions. While such resins can be applied from an organic liquid based composition, it is preferred in the practice of the present invention to utilize water-based compositions, and particularly acrylic latices. Such protective and weather resistant acrylic resins are known and are referred to in the industry as resins which are recommended for use in outdoor applications. For use as a roofing material, it is preferred to use an elastomeric roof acrylic resin.

A preferred acrylic latex for use in the formation of the underlying coating and one which exhibits excellent adhesive properties to many types of structural materials is Rhoplex AC-507 sold by Rohm & Haas Company and having a percent total solids content of about 46–47, a pH of 9.5–10.0, a density of about 9 lbs/gal, a minimum film temperature (MFT) of 12°–16° C. and a Tukon hardness (KHN) of 1. Rohm & Haas literature describes this latex as being developed for use as exterior gloss and semi-gloss trim paints. The latex is described as including good flow and film build properties, high initial gloss and good gloss clarity, good adhesion over aged glossy surfaces, excellent dirt and chalk resistance and gloss retention. Although this latex can be used as a roofing material, it is preferred to use it in other applications, for example, in the repair of retaining walls or the vertical sides of buildings.

A preferred acrylic latex for use in the formation of the underlying coating in a roofing application is sold under the trademark Rhoplex EC-1685, which is described by Rohm and Haas Company, its producer, as being particularly developed for use in an elastomeric roof mastic. This latex is described as having improved flexibility properties which are retained even at low temperatures, for example, −35° F. Coatings formed from this latex have also improved expansion and contraction properties which are typically encountered in roofing applicaitons where the underlying substrate tends to expand and contract, as occurs with temperature variations. Accordingly, coatings formed from Rhoplex EC-1685 latex are particularly resistant to rupturing, and possess also excellent impact resistance. In addition, such coatings resist dirt pick up to a high degree, this property being important when the coating is applied as a top coating, for example, in applications of the type described hereinbelow. Rhoplex EC-1685 latex has a total solids content of about 63%, a pH of about 5, a density of about 9 lbs/gal, an MFT of less than 0° C., and a KHN of less than 1. The manufacturer attributes the absence of plasticizer in the latex as being responsible for many of its attractive properties, including its high resistance to property degradation.

A particularly preferred acrylic latex for use in the formation of the underlying coating in a roofing application is Experimental Emulsion E-1791 which is recommended by its producer Rohm and Haas for use in roof mastics. Such compositions form coatings that have superior adhesion to polyurethane foam. The significance of such adhesion is that there has been a trend in the roofing industry, as a result of the energy saving movement, to installing insulated roofs, with polyurethane foam being one of the most widely used insulating materials. The E-1791 latex has a total solids content of about 55%, a pH of about 9–10, a density of about 8.65 lbs/gal, a glass transition temperature (Tg) of about −40° C. and a viscosity of less than 200 cps. Coatings formed from this latex have the properties expected of a good roofing material, and in addition, exceptional bond strength to polyurethane foam.

Another particularly preferred acrylic latex for use in the formation of the underlying coating in a roofing application is Experimental Emulsion E-1895, also recommended by its producer Rohm and Haas Company for use in roof mastics. Coatings formed from much mastics have excellent roofing properties, and in addition, superior resistance to ponded water conditions which are often encountered on flat roofs. This latex has a total solids content of about 61%, a pH of about 9–10, a density of about 8.85 lbs/gal, a Tg of about −50° C., and a viscosity of about 200 to about 600 cps.

The aforementioned latices containing elastomeric roof acrylic resins are exemplary. Others can be used in the practice of the present invention.

The underlying coating which is sandwiched between the substrate and the overlying other acrylic resin coating includes preferably fly ash, a waste material that comprises finely divided ash residue produced from the combustion of pulverized coal. Such ash residue, which is a well known, commercially available material, is collected from exhaust gases of coal-burning equipment by suitable apparatus such as, for example, electrostatic precipitators.

Fly ash, which is generally a heterogeneous mixture of both crystalline and non-crystalline particulate materials, includes a variety of materials including for example, calcium, aluminum, iron, and sulfur. These elements exist in various forms in the fly ash. The chemical analysis differs from one fly ash to the next depending on various factors, including, for example, the nature of the coal from which the ash is produced and the conditions of combustion. The following is exemplary of the chemical analyses of various types of fly ash.

| Reported As | Approximate Weight Percent |
| --- | --- |
| silicon dioxide | 35–70 |
| aluminum oxide | 20–40 |
| iron oxide | 1.5–15 |
| sulfur trioxide | 0–5 |
| calcium oxide | 0–5 |
| magnesium oxide | 0–5 |
| water | 0.25–0.5 |

It should be understood that a particular fly ash may have an analysis outside the analysis set forth above, but it nevertheless would be suitable for use in the practice of the present invention.

For use in the practice of the present invention, fly ash can be used in the form in which it is collected from exhaust gases. However, for some applications it may be desirable to use a more homogeneous and/or finer particle size fly ash, and this can be done by pulverizing the fly ash. An example of fly ash that has been used in the practice of the present invention is one in which less than 1% remains on a 0.1"×0.1" screen utilizing agitation.

In preparing the fly ash-containing compositions of the present invention, it is recommended that the fly ash be added to the acrylic resin-containing liquid composition as this helps to avoid stirring up the fine particles of fly ash. The liquid/fly ash composition can be admixed in any suitable mixing device, for example, one including a ribbon mixer or paddle mixer.

The presence of fly ash in the coating contributes to the inertness, and thus the stability and weathering characteristics of the coating, and imparts light weight, as well as toughness, to the coating, In addition, the presence of fly ash in the coating imparts thereto excellent fire resistant properties. The mere presence of fly ash in the composition is sufficient to modify the properties of coatings formed therefrom, but it is recommended that the following guidelines be used in connection with determining the amount of fly ash, as well as the amount of other ingredients, comprising the composition. The proportions of acrylic resin and fly ash should be selected so that there is at least sufficient resin present to bind tightly the particles of fly ash, while having sufficient fly ash present to impart to the coating some significant degree of fire resistant and/or improved weathering characteristics. In general, the amount of water present in the composition should be such that the composition has good workability properties. One of the advantages of the present invention is that it is not necessary to add to the composition water over and above the water present in the latex which is the source of the acrylic resin.

Underlying coatings having the aforementioned properties can be formed from a composition comprising about 10 to about 45 weight percent of acrylic resin, about 30 to about 80 weight percent of fly ash and about 5 to about 35 wt. % of liquid, preferably water, and in an amount which imparts good workability or application properties to the composition. Fly ash in the aforementioned proportions helps to form a smooth coating having good fire resistant properties. From about 5 to about 80 weight percent of the fly ash can be replaced by fillers such as, for example, sand, perlite, polystyrene beads and mixtures of the same. Preferred amounts of ingredients include about 10 to about 35 weight percent acrylic resin, about 45 to about 75 weight percent fly ash, and about 10 to about 25 weight percent water. Particularly good results can be achieved utilizing any of the aforementioned latices and fly ash in ratio of 1 volume part of the latex to 2 to 3 volume parts of the fly ash.

The acrylic resin/fly ash composition adheres to an applicator, such as a brush, without dripping or running. When spread on the receiving surface with normal pressure of application, thinning occurs to a consistency that permits ready application and any small holes, cracks, and splits, etc. in the surface are filled in nicely. The applied coating is continuous, smooth and level as it begins to dry. The leveling properties of the composition are particularly good. The thixotropic nature of the composition affords the user the advantage of being able to apply a thicker layer of coating that can be applied utilizing an acyrlic latex that does not contain fly ash. The solid coating has good flexibilty, hardness, and abrasion resistance, and good durability properties, with the fly ash particles being bound tightly in the acrylic resin binder.

As mentioned above, the acrylic resin and the acrylic resin/fly ash coatings of the present invention adhere tightly and strongly to a variety of different kinds of substrates, including, for example, wood, cement, metals, for example, tin, aluminum, and galvanized surfaces, tile, brick, slate, concrete, asphalt shingles, tar paper, and other types of bituminous materials. However, as mentioned above, such acrylic resins do not adhere well to themselves, and accordingly, in applications in which more than one layer or ply of coating is required, the underlying coating needs to be covered with a coating formed from a composition which includes a different type of acrylic resin.

The acrylic resin of the overlying coating is one which forms a stronger adhesive bond to the acrylic resin coating of the underlying coating than is formed between coatings, each of which comprises the acrylic resin of the underlying coating. While there are various acrylic resins which possess such excellent adhesive characteristics, a preferred acrylic resin is the Rohm and Haas latex sold under the trademark Rhoplex AC-22. This latex has a percent total solids of about 44–45, a pH of about 9.5–10.0, a density of about 8.85 lbs/gal, an MFT of about 7°–9° C. and a KHN of 1. Rohm and Haas product literature refers to this latex as being particularly suitable for formulating interior latex primers, semigloss, dripless and flat wall paints. The latex is described as having superior flow, leveling and hiding power properties and exhibiting excellent adhesion, color retention, durability, and resistance to alkali and water.

For outdoor applications, the underlying coating should be covered with a top coating having outdoor (exterior) properties. It is preferred that the top coating comprise an acrylic resin having such properties. In roofing applications, it is preferred that the top coating comprise an elastomeric roof acrylic resin. Such resins possess a combination of properties that make them more suitable for use in outdoor applications than the acrylic resin comprising the overlying coating, the properties of which make it suitable for use in indoor (interior) applications. Although such "indoor" acrylic resins have excellent adhesive properties, such properties, as well as other properties, tend to degrade when such resins are exposed directly to outdoor conditions, including the rays of the sun. Accordingly, the overlying coating can be covered with a liquid composition comprising an outdoor or elastomeric roof acrylic resin, such as those which comprise the underlying coating, as described hereinabove.

Color can be imparted to the visible coating of the multi-ply coating for asthetic and/or functional purposes. For example, white top coatings can be used to particular advantage in roofs of buildings which are air conditioned. White coatings reflect the sun's rays, and are thus responsible for lowering the roof temperatures, which in turn reduces the energy requirements of the air conditioning system. Titanium dioxide has been used to good advantage as a white pigment in the practice of the present invention.

Thickness of each of each of the underlying, overlying, and top coatings can be varied as desired to give suitable results. In general, the minimum thickness will be governed principally by the thickness that affords the desired protective and/or adhesive properties, whereas the maximum thickness will generally be governed by economic considerations and/or the ability of the liquid film of composition to dry without cracking. It is believed that coating thicknesses within the following ranges will be used most widely in the practice of the present invention: underlying coating, about 25 to about 75 mils; overlying coating, about 5 to about 20 mils; and top coating, about 5 to about 20 mils.

As mentioned above, a particularly preferred embodiment of the present invention comprises a substrate coated with a multi-ply coating which includes an underlying coating adhered to the surface of said substrate and comprising a highly adhesive acrylic resin, with the underlying coating being adhered to an overlying coating comprising acrylic resin and fly ash, the acrylic resin of said overlying coating having outdoor (exterior) properties and being different than the acrylic resin of said underlying coating. The highly adhesive acrylic resin of the underlying coating can comprise the highly adhesive acrylic resin of the overlying coating described above in connection with the other embodiment of the present invention. The acrylic resin/fly ash overlying coating of the particularly preferred embodiment of the present invention can comprise the acrylic resin/fly ash underlying coating of the type described above in connection with the other embodiment of the present invention. A top coating can be applied to the overlying coating, if desired, the top coating comprising preferably an acrylic resin having outdoor (exterior) properties and being preferably an elastomeric roof acrylic resin when the top coating is used in a roofing application. In general, it will be advantageous to use white pigmented top coatings for reasons explained above in connection with the description of the other embodiment of the present invention.

The thicknesses of each of the underlying, overlying, and top coatings can be varied, as desired, in accordance with the principles stated above in connection with the other embodiment of the present invention. It is believed that coating thicknesses within the following ranges will be used most widely in the practice of the present invention: underlying highly adhesive coating, about 5 to about 20 mils; overlying acrylic resin/fly ash coating, about 25 to about 75 mils; and top coating, about 5 to about 20 mils.

Coatings formed from the acrylic resins of the type to which this invention relates in general are highly resistant to degradation by ultraviolet rays. However, if desired, an ultraviolet ray absorber can be included in the composition from which the coating is formed. It would be appropriate also to include an ultraviolet ray absorber into a coating composition which included another resin admixed with the acrylic resin. Other resins can be used in admixture with the acrylic resin, but as a minor proportion of the resin portion of the composition. If such other resin does not have the good resistance to ultraviolet ray degradation, it would be advantageous to include an ultraviolet ray absorber into the coating composition. An ultraviolet ray absorber that has been used in the practice of the present invention is Thalo green sold by Tenneco Chemical Company, for example, in an amount of about 0.1 part per part of composition by volume.

As mentioned above and as illustrated in the examples which follow, the preferred source of acrylic resin for use in the practice of the present invention is a latex of the acrylic resin, typically, a thermoplastic acrylic resin. In formulating a coating composition containing fly ash and latex, satisfactory results will generally be achieved by formulating a composition comprising about 40 to about 75 wt. % fly ash and about 20 to about 60 wt. % of an acrylic latex which includes an acrylic resin having outdoor (exterior) properties and preferably a latex selected from the group consisting of Rhoplex AC-507, Rhoplex AC-1685, Experimental Emulsion E-1791, and Experimental Emulsion E-1895. A preferred composition includes about 45 to about 75 wt. % of fly ash and about 25 to about 55 wt. % of said latex. It should be understood that the solids contents of latices tend to vary, and accordingly, such variation should be taken into account in formulating the coating composition.

EXAMPLES

Examples below are illustrative of the present invention.

The first example shows the coating of a rusted tin roof using a fly ash/acrylic resin undercoat and two overlying coatings of different acrylic resins.

EXAMPLE 1

After cleaning the tin roof, an undercoating composition comprising 3 parts of fly ash and 1 part of Rhoplex AC-507 arcylic emulsion was used to cover the entirety of the tin roof (about 150 square feet) and flashings. The composition exhibited excellent adhesion and filled in ridges damaged by rust. Some portions of the roof had depressions and ridges up to ⅛ inch deep. These irregularities were leveled easily and the composition dried throughout. The coating had a thickness, in general, of about 32 mils.

The coating dried very quickly in open air (about 80° F.) and in less than two hours was ready itself to be coated. A satisfactory dryness test to determine the time for applying the second coat can be made by a fingernail scratch or by observation of color which is dark grey when the composition is applied and becomes light grey when dry.

The thickness of the second coat of the composition, which dried quickly, was about 8 mils and comprised Rhoplex AC-22 acrylic emulsion After about 1 hour, this intermediate coating was coated with a composition comprising 4 parts Rhoplex AC-507 emulsion and 1 part titanium dioxide. A clean white titanium dioxide finish was obtained.

The next example shows the coating of a tin wall of a home and also roll roofing of the same home utilizing a fly ash/acrylic resin undercoat and two overlying coatings of different acrylic resins, as described in Example 1.

EXAMPLE 2

A vertical tin wall of about 120 square feet and a roof of about 300 square feet and comprising 90 lb. mineral surface roll roofing were each coated with a composition comprising 3 parts of fly ash and 1 part of Rhoplex AC-507 acrylic emulsion. The coatings showed excellent adhesion to the tin wall and to the roll roofing.

The composition worked well as a thixotropic coating to blend in joints where the roll roofing overlapped and to feather edge the overlaps, thus greatly minimizing the previous danger of wind uplift and vulnerability of sharp edges in a storm situation. The coating had a thickness, in general, of about 32 mils.

The next day the coated wall and roofing were coated with Rhoplex AC-22 acrylic emulsion using a heavy nap roller. The coating thickness was about 8 mils and the coating after application was dry in about one hour. The coated wall and roof were then coated with a top coat comprising 4 parts of Rhoplex AC-507 emulsion and 1 part of titanium dioxide.

The next example shows the coating of an asphalt roofing material utilizing the present invention and exemplifies the use of acrylic resins without fly ash.

EXAMPLE 3

A coating of Rhoplex AC-507 acrylic emulsion is applied to a third floor roof over asphalt roll roofing having an area of about 250 sq. ft. It took about 5 gallons of composition to cover this area. A few hours later, the coating was dried and was ready for a second coat. The second coat comprised Rhoplex AC-22 acrylic emulsion which dried in 1 hour after which a final white coat of 4 parts of Rhoplex AC 507 acrylic emulsion and 1 part titanium dioxide was applied. Several days later, scratch tests with fingernail and roofing nail showed excellent resistance and no film failure.

The next example shows the use of the present invention to repair cracks in and refinish a retaining wall made from concrete blocks.

EXAMPLE 4

Large cracks in a retaining wall which had an area of about 150 sq. ft. were covered with strips of fiberglass (commonly used in repairing roofs) which were applied with Rhoplex AC-22 acrylic emulsion. The wall was then covered with a Rhoplex AC-507/fly ash mixture using a 0.4 to 1 mix which was sufficiently thick so that a stucco finish with a herring bone design could be applied The next day this coating was covered with Rhoplex AC-22 acrylic emulsion which included green colorant This coating dried in about 2 hours after which it was covered with a tan-colored composition comprising Rhoplex AC-507, titanium dioxide and brown iron oxide colorant (160:40:1). The first coating was applied at the rate of 40 sq. ft./gal, the second at the rate of 400 sq. ft./gal, and the third at a rate of 250 sq. ft./gal.

The next example shows the use of the present invention to refinish a slate roof.

EXAMPLE 5

A composition comprising Rhoplex AC-507 acrylic emulsion and fly ash was applied over the entirety of a roof using 3 to 1 mix. Although the shape of the slates could be seen, adhesion was good and voids and split separations were filled in nicely. The roof had a solid look and was sealed. Since the roof was an A frame, and maximum adhesion was necessary for foot traffic, a full day was allowed for drying and set up.

The next morning, a coating of green tinted Rhoplex AC-22 acrylic emulsion was applied over a one and one-half hour period was allowed one additional hour to dry. It was then ready for coating with a mixture of Rhoplex AC-507 and titanium dioxide (4 to 1 ratio) at rate of 350 sq. ft./gal.

The next example shows the application of roofing material of the present invention to roofing insulation.

EXAMPLE 6

The old wooden shingles on the roof of a home were removed, and ½ inch exterior ply wood was installed. Thereafter, Dow Chemical one-inch Styrofoam insulation was applied over the complete area. Six-inch strips of 10 by 10 mesh fiber glass screening were applied over the seams and joints using Rhoplex AC-507 acrylic emulsion and fly ash (one part per three parts) as an adhesive for some and Rhoplex EC-1685 acrylic emulsion and fly ash (one part per two parts) for the others. Both worked well, with the "EC-1685" exhibiting much stronger adhesive qualities, but being more difficult to apply. (The coatings provide excellent fire barrier protection for the insulation.) Thereafter, these areas were covered also with eight inch and thirty-six-inch strips of fiber glass mat which were adhered with Rhoplex AC-22 acrylic emulsion The complete roof was then covered with a composition comprising three parts of Rhoplex AC-507 emulsion and one part of fly ash. After the coating was dry, it was covered with a composition comprising Rhoplex AC-22 acrylic resin emulsion and green pigment. Thereafter, the complete roof was covered with Rhoplex AC-507 emulsion.

The coatings of the aforementioned examples were checked several months after they were applied and found to be in fine shape.

The next example shows the coating of a badly deteriorated tin roof.

EXAMPLE 7

A tin standing seam roof, which was in poor condition and leaking badly, was repaired utilizing two different systems for initially covering the cracks and other badly deteriorated areas. Where the tin was widely separated or badly rusted away, fiber glass mats were used by adhering them to the substrate with Rhoplex AC-22 emulsion. Smaller cracks were covered with a composition comprising one part Rhoplex EC-1685 emulsion and two parts fly ash, with some fiber glass strips being used in the bad areas. Thereafter, the roof was coated with a composition comprising one part of Rhoplex AC-507 emulsion and three parts of fly ash. The next day, the roof was checked for cracks and found to be intact in all areas. A coating composition comprising Rhoplex AC-22 emulsion and green pigment was then applied and after two hours, when the coating was dry to the touch, the roof was coated with a composition comprising Rhoplex AC-507 emulsion and titanium dioxide.

Several months after the roof was coated, and at a time immediately after the roof had been exposed to unseasonably warm nights, as well as 20°-30° F. temperatures, it was inspected and no signs of failure were found.

As mentioned above, there can be used in the practice of the present invention acrylic resin/fly ash compositions which include also fillers, such as sand and perlite. The following are examples of such compositions.

EXAMPLE 8

| | |
|---|---|
| Rhoplex AC-507 acrylic resin emulsion | 1 part |
| fly ash | 1.5 parts |
| perlite | 1.5 parts |

The above composition has good adhesion to vertical as well as horizontal surfaces. The fly ash fills in between the perlite particles and imparts good body and texture to the composition.

EXAMPLE 9

| Rhoplex EC-1685 acrylic resin emulsion | 1 part |
| --- | --- |
| fly ash | 1 part |
| bar sand | 1 part |

The above composition exhibits excellent adhesion to vertical and horizontal surfaces and forms a coating that has an appealing sand finish appearance.

The next two examples show the use of a highly adhesive acrylic resin to form a coating on a substrate and the application thereto of an overlying coating comprising an elastomeric roof acrylic resin and fly ash.

EXAMPLE 10

A roof covered with asphalt roll roofing in a deteriorated state is covered with a coating of Rhoplex AC-22 acrylic resin emulsion. Cracks in the roll roofing are filled in nicely. The thickness of the coating is about 20 mils. After the coating is dry, there is applied thereto an aqueous coating composition comprising two parts of fly ash and one part of Experimental Emulsion E-1791 latex. The thickness of this coating is about 50 mils. The coating is allowed to dry. Investigation shows that the adhesion of the overlying to the underlying coating is excellent.

EXAMPLE 11

A roof of the type referred to in Example 10 is coated as described in Example 10, except that the overlying coating is formed from a liquid composition comprising two parts of fly ash and one part of Experimental Emulsion E-1895 latex. In addition, the overlying coating is covered with a liquid composition comprising Experimental Emulsion E-1895 latex and titanium dioxide in an amount sufficient to impart to the coating a white appearance.

The following latices were used in the compositions and processes described in the examples: Rhoplex AC-507; Rhoplex EC-1685; Rhoplex AC-22, Experimental Emulsion E-1791; and Experimental Emulsion E-1895. These latices are described respectively in the following trade publications of Rohm and Haas Company: Trade Sales Coatings, Rhoplex AC-507, Acrylic Emulsion Polymer for Exterior Gloss Paints, 81A13 (July, 1980); Elastomeric Roof Mastics Rhoplex EC-1685, 83E2 (April, 1982); Semi-gloss Enamels Made With Rhoplex AC-22, C-230 (October, 1967); Elastomeric Roof Mastics Experimental Emulsion E-1791, 83E8 (October, 1982); and Elastomeric Roof Mastics Experimental Emulsion E-1895, 83E7 (October, 1982). The disclosures of each of the aforementioned trade publications is incorporated herein by reference.

The fly ash referred to in the examples was obtained from Metropolitan Edison, Titus plant, Reading, Pa. and had a particle size such that less than 1 percent remained on an agitated 0.1"×0.1" screen.

The green colorant or pigment used in various of the compositions of the examples was Thalo green, sold by Tenneco Chemical Company. The white pigment used in various of the compositions of the examples was titanium dioxide, sold by Tenneco Chemical Company, and included glyrold and wetting agent.

It should be understood that the above examples are illustrative, and that compositions other than those described above can be used while utilizing the principles underlying the present invention. For example, other sources of acrylic resins, as well as mixtures of acrylic resins and/or acrylic latices, can be used in formulating the coating compositions. Other suitable types of resins can be used in combination with acrylic resin to improve the properties of the coating composition and/or of the coating formed therefrom, provided that the acrylic resin comprises the major the resin proportion of the composition. The coating compositions can be applied to various types of substrate materials, as described above, and such materials can be part of a structure other than a roof, for example, sides of buildings, retaining walls, and traffic ways.

In summary, it can be said that the present invention provides means for realizing substantial improvements in the installation and refurbishing of roofs and other structures utilizing improved coating compositions and processes for applying the same.

1. An article of construction comprising a substrate coated with a multi-ply coating, one of said coatings being an underlying coating adhered to the surface of said substrate and underlying and adhered to an overlying coating, said underlying coating being weather-resistant and fire-resistant and being formed from an aqueous adhesive composition which includes an elastomeric roof acrylic resin, said overlying coating being formed from an aqueous adhesive composition which includes an acrylic resin which is different from the acrylic resin of said underlying coating, the adhesive bond between said overlying and underlying coatings being stronger than if the bond were between two coatings formed from the acrylic resin of said underlying coating, and wherein said overlying coating has adhered thereto a top coating which consists essentially of an elastomeric roof acrylic resin.

2. An article according to claim 1 wherein said substrate is a roofing substrate and wherein said overlying coating consists essentially of an elastomeric roof acrylic resin.

3. An article according to claim 1 wherein the acrylic resin of said overlying coating is an indoor acrylic resin.

4. An article according to claim 2 wherein said top coating includes a sufficient amount of white pigment to impart thereto a white color.

5. An article according to claim 1 wherein said underlying coating has a thickness of about 25 to about 75 mils, and wherein each of said overlying and top coatings has a thickness of about 5 to about 20 mils.

6. An article according to claim 1, 2, 3, or 4 wherein said overlying coating consists essentially of acrylic resin and fly ash.

* * * * *